Feb. 28, 1967   B. W. BARRINGER   3,306,087
AUTOMATIC GAUGE CONTROL SYSTEMS
Filed March 19, 1964   4 Sheets-Sheet 3

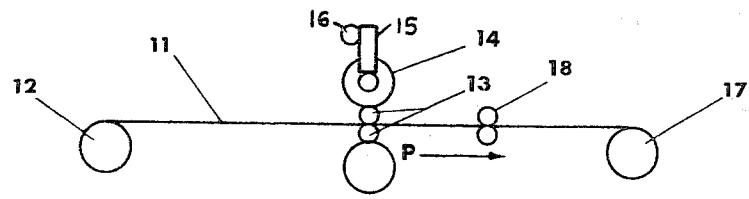
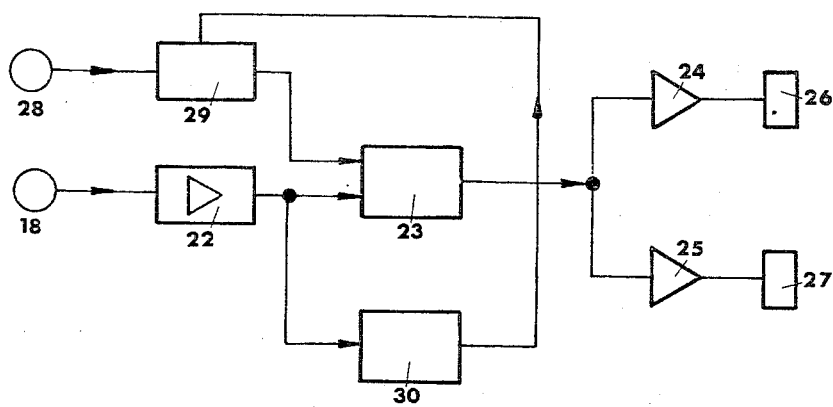
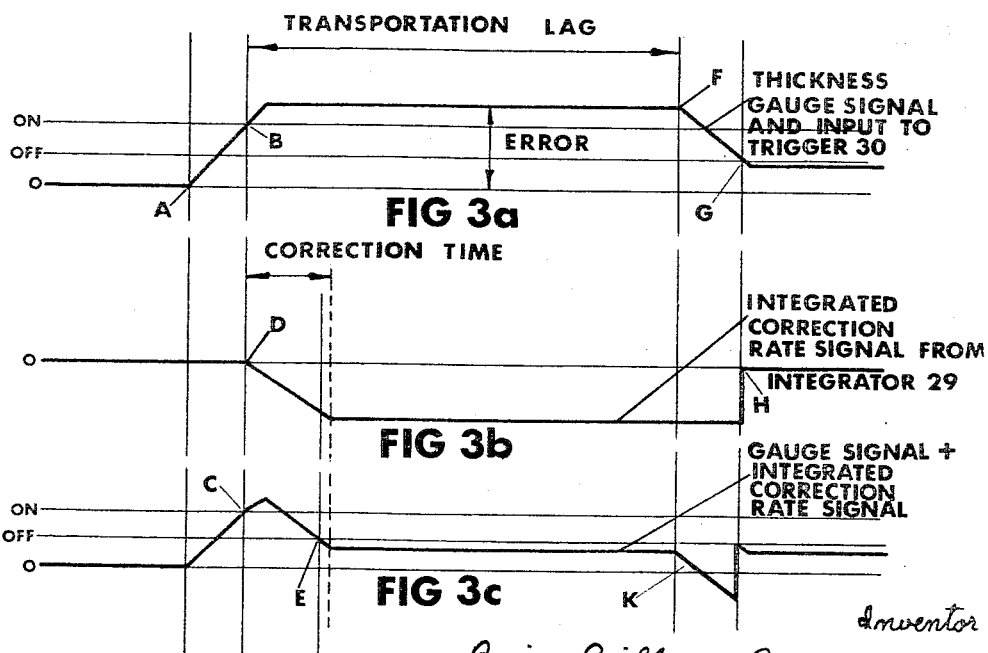

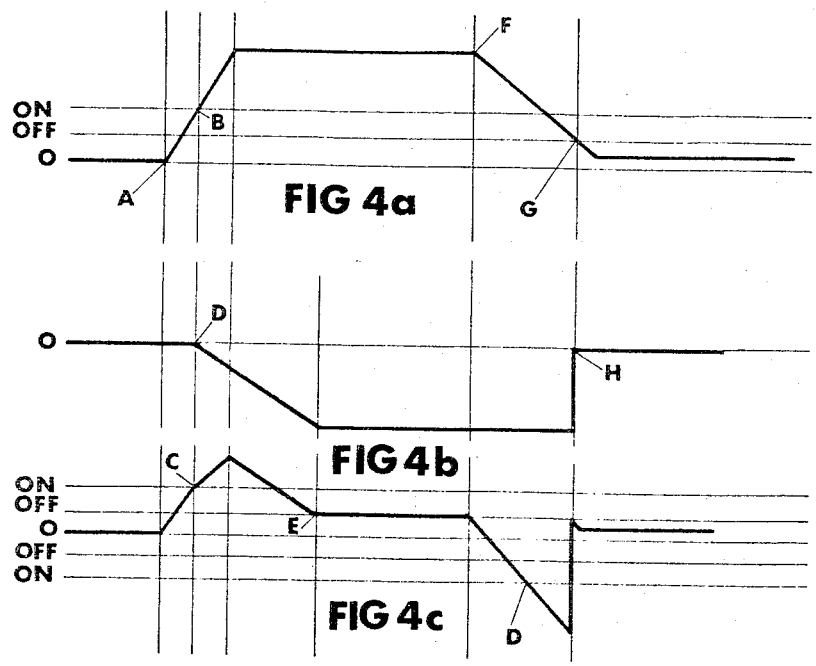

Inventor
Brian Wilfred Barringer
by Pierce, Scheffler & Parker
attys

Inventor
Brian Wilfred Barringer
by Pierce, Scheffler & Parker
atty's

United States Patent Office 3,306,087
Patented Feb. 28, 1967

3,306,087
AUTOMATIC GAUGE CONTROL SYSTEMS
Brian Wilfred Barringer, East Twickenham, Middlesex, England, assignor, by mesne assignments, to The Rank Organisation Ltd., London, England, a British company
Filed Mar. 19, 1964, Ser. No. 353,218
Claims priority, application Great Britain, Mar. 21, 1963, 11,353/63
8 Claims. (Cl. 72—9)

This invention is concerned with improvements in or relating to automatic gauge control systems, and is concerned especially, but not exclusively, with an automatic system for controlling the gauge, that is to say the thickness, of metal strip being processed in a rolling mill.

The application of automatic control to regulate the thickness of material emerging from a continuous strip or web producing mechanism has been proposed, and an example of this is the control of the thickness of metal strip emerging from a hot or cold reduction rolling mill.

In an elementary system of automatic control of the screw motors where the screw motors are caused to run in response to an error signal from the gauge and in a direction to tend to correct the error, instability can result from the effect of the gauge sensing the correction applied to the strip at a time after the application of the correction. This time lag, referred to in the art as the transportation lag, results from the placing of the gauge at a distance from the rolls, and exists because for practical reasons gauges for sensing the thickness of strip emerging from the rolls have to be placed at a distance from the rolls. This instability is particularly pronounced at low rolling speeds, high correction rates, and fine tolerance. The time taken, because of transportation lag, for the gauge to sense the correction which has been applied to the strip and to stop the screw motors applying further correction results in the correction being applied for an unduly long time. This gives rise to over-correction, and instability, and it is an object of the present invention to overcome this drawback.

According to one aspect of the present invention there is provided an automatic gauge control system for a material processing mechanism, an automatic gauge control system for a material processing mechanism, comprising gauge means for monitoring the gauge of said material issuing from said mechanism and control means for actuating said material processing mechanism to correct the gauge of said material to a desired value in one continuous, steady correction in response to signals from said gauge means.

According to another aspect of the present invention there is provided a method of controlling the gauge of material issuing from a material processing mechanism, comprising the method of controlling the gauge of material issuing from a material processing mechanism, comprising the steps of generating an electrical gauge signal proportional to the gauge of said material as it leaves said mechanism, and employing said gauge signal to regulate said mechanism to correct the gauge of said material in one continuous, steady correction, rather than in bursts, when the thickness of said material exceeds predetermined tolerance limits.

Embodiments of the system and method according to the present invention will now be particularly described hereinafter by way of example with reference to the accompanying drawings, in which;

FIGURE 1 is a diagrammatic representation of a rolling mill showing the general disposition of the main component parts of the mill and of the automatic gauge control system;

FIGURE 2 is a representation, in block diagram form, of the automatic gauge control system;

Figure 5:
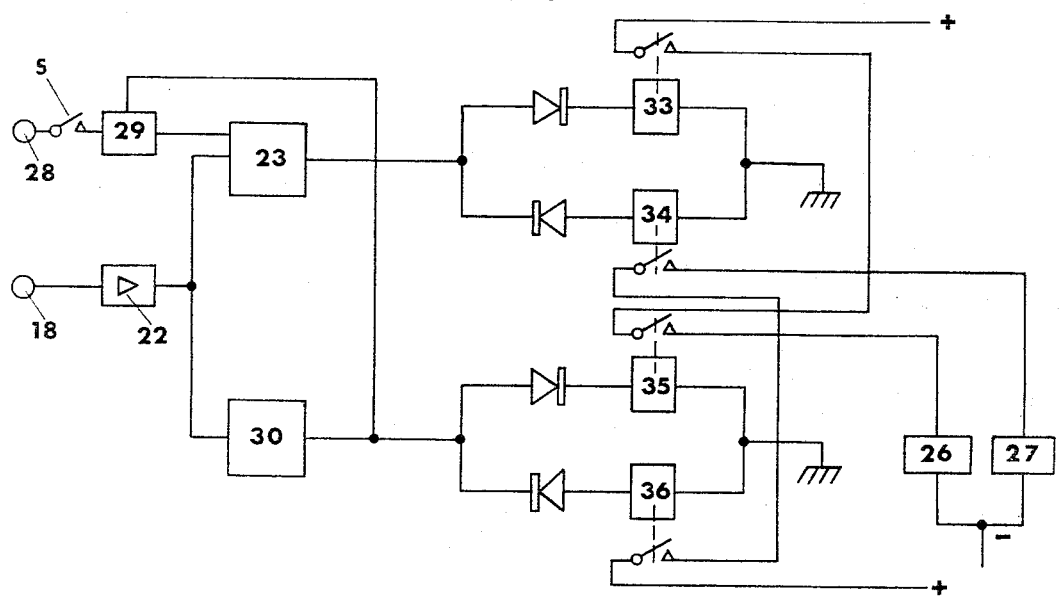
Figure 8:
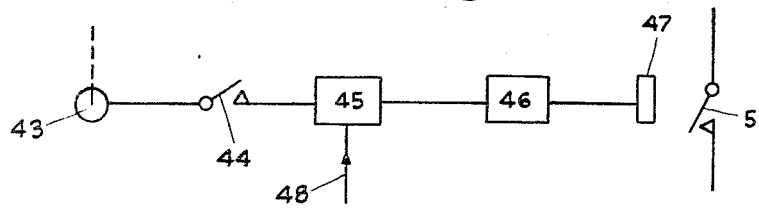
Figure 6A:
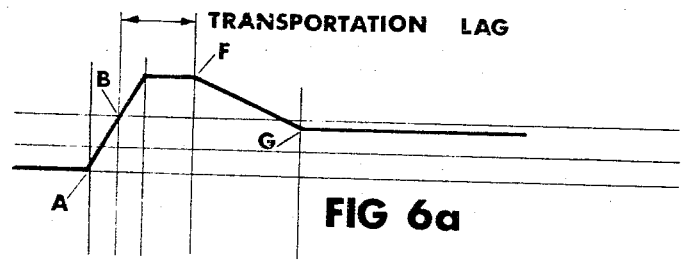
Figure 6B:
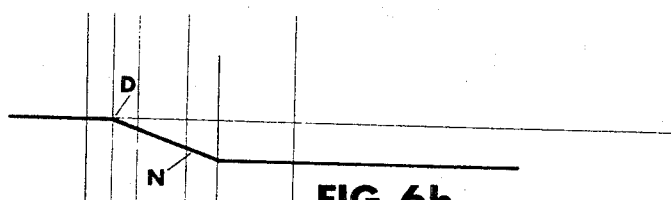
Figure 6C:
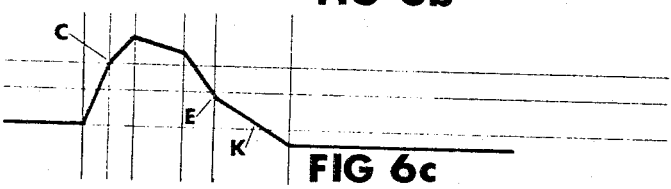
Figure 7A:
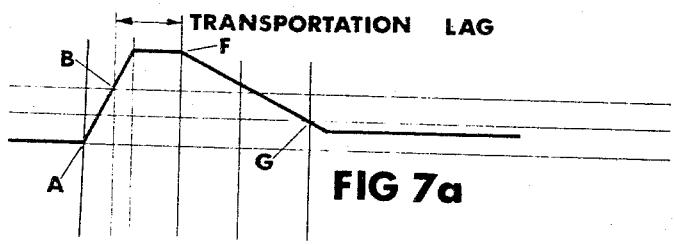
Figure 7B:
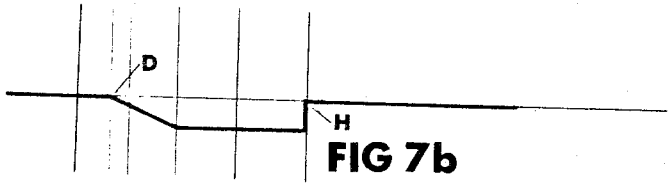
Figure 7C:
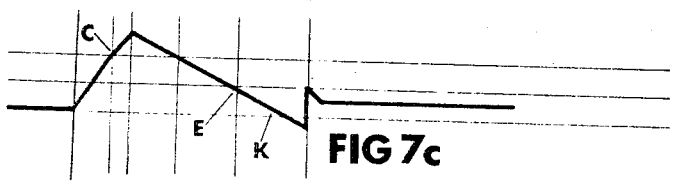

FIGURES 3a, 3b, and 3c are illustrations, in graphical form, of the operation of the automatic gauge control system shown in FIGURE 2;

FIGURES 4a, 4b, and 4c are illustrations, in graphical form, of the operation of a modification of the embodiment shown in FIGURES 1 and 2 for dealing with unusually large errors in the gauge of strip being rolled;

FIGURE 5 is a representation in block diagram form, of this modification;

FIGURES 6a, 6b, and 6c are graphical illustrations of the operation of the previous embodiments in the case of comparatively short transportation lags;

FIGURES 7a, 7b, and 7c are graphical illustrations of the operation of a further modification specifically intended for short transportation lags; and FIGURE 8 is a representation, in block diagram form, of a modification of the system the operation of which is illustrated in FIGURES 7a, 7b, and 7c.

Referring to FIGURE 1 of the drawings, a material processing mechanism in the form of a strip rolling mill has metal strip 11 fed from a reel 12 between its work rolls 13. The metal strip 11 is reduced in thickness by the application of force from a backing roll 14 through the action of a screw 15 and a screw motor 16. The work rolls 13 are continuously rotated to urge the metal strip 11 forward in the direction shown by the arrow P, on to a take-up reel 17 which is rotated to maintain tension on the metal strip 11, and which controls the thickness of the metal strip 11 to some extent. Gauge means in the form of an electrical thickness gauge 18 measure the thickness of the metal strip 11 emerging from the work rolls 13. Electrical signals generated by the gauge 18 are employed to regulate the thickness of the metal strip 11 by the control of pressure from the screw 15 and screw motor 16 in this embodiment, although control of the tension in the strip 11 produces by the drive of the take-up reel 17 may also be used for this purpose.

Referring to FIGURE 2 of the drawings, the electrical thickness gauge 18 senses the deviations of thickness of the continuously moving metal strip 11 from a desired value, and when the output of an amplifier 22 connected to the gauge 18 exceeds a predetermined level, a trigger unit 23 switches on one of two relays 26 or 27 via amplifiers 24 or 25 respectively, according to whether pressure on the work rolls 13 is to be increased or reduced. The relay 26 or 27, when energized, in turn switches on the screw motor 16 in the direction required to correct the deviation in thickness, and an integrator 29 then begins to integrate the output of a rate transducer in the form of a tacogenerator 28 coupled to the screw mechanism 15. The output of the integrator 29 is coupled into the trigger unit 23 in such a direction as to oppose the thickness deviation signals from the amplifier 22. When the sum of the two combined signals is reduced to a predetermined level the trigger 23 switches off the relay 26 or 27, and the screw motor 16 ceases to apply correction to the pressure on the work rolls 13.

When the corrected strip 11 passes through the gauge 18, a trigger unit 30 cancels the output from the integrator 29, and the resultant input into the trigger unit 23 is the gauge signal alone, now corresponding to the corrected thickness of the strip 11. Thus, provided that the output from the integrator 29 is substantially equal to the actual correction applied to the metal strip 11 as represented at the output of the amplifier 22, the level of the strip thickness signal when the corrected strip 11 is in the gauge 18 is the same as that of the uncorrected thickness signal combined with the integrated correction signal. Manual or automatic adjustment of the integrator input or time constant for particular rolling conditions ensures this condition.

The operation of the system takes place, according to the following sequence of events, in which one full correction cycle is described.

Referring to FIGURE 3, the signal from the electrical thickness gauge 18 sensing the thickness of the metal strip 11 represents electrically the departure of the thickness of the metal strip 11 from the desired nominal value. When the thickness of the metal strip 11 issuing from the rolls 13 is equal to the desired nominal value, there is no departure in thickness and hence no output from the thickness gauge 18, whereas when there is a departure, the signal changes correspondingly. In FIGURE 3a the signal from the thickness gauge 18 is shown for the case where the thickness of the metal strip 11 is at first equal to the desired nominal value represented by the line O, and then rises and becomes too great, thus giving rise to a positive signal beginning at A, and gradually increasing in level with the increase in thickness of the metal strip 11 as it passes by the gauge 18. Correction begins at the point B, but the corrected portion of the strip 11 does not reach the gauge 18 until the point F.

The signal from the thickness gauge 18 is supplied via the amplifier 22 to the trigger unit 30, which in turn controls the operation of the integrator 29, as shown in FIGURE 2, and the input to the trigger unit 30 is therefore also as shown in FIGURE 3a.

The signal from the thickness gauge 18 is also fed to the trigger unit 23, but in addition to this the output from the integrator 29 is combined with this signal and the sum of the two signals comprises the actual input to the trigger unit 23. This input is shown in FIGURE 3c.

In the absence of any output from the integrator 29, therefore, the input to the trigger unit 23 is the same as the input to the trigger unit 30, and is equal to the signal from the thickness gauge 18.

As the signal from the thickness gauge 18 departs from zero level with the increase in thickness of the metal strip 11, the input to the trigger units 30 and 23 rises to their respective "on" levels B and C. As the trigger unit 23 comes into operation, it starts the screw motor 16 by way of the amplifier 24 and relay 26, as hereinabove described, while at the same time the trigger unit 30 switches on the integrator 29, as shown at D in FIGURE 3b. The transducer 28, which is coupled to the screw mechanism 15, produces an output which is integrated in the integrator 29. The output from the integrator 29 is as shown in FIGURE 3b, and is proportional to the amount of correction which the screw mechanism has applied to the rolls 13. The output from the integrator 29 appears at the input to the trigger unit 23 in antiphase to the gauge signal from the gauge 18 and amplifier 22, as hereinabove described. The two signals are therefore subtracted from one another, and their algebraical sum forms the actual input to the trigger unit 23, in accordance with FIGURE 3c, which is the sum of FIGURES 3a and 3b.

As the screw motor 16 continues to run and correction progresses, the output from the integrator 29 increases, and consequently the input to the trigger unit 23 falls gradually until it passes the "off" level, corresponding to the point E in FIGURE 3c. At this point the trigger unit 23 switches off the screw motor 16 so that change of pressure on the work rolls 13 ceases. As indicated by the dotted line in FIGS. 3b and 3c, the integrated correction signal is shown as continuing for a short time after the "off" level has been passed in trigger 23. This is an illustration of the effect of screwdown motor braking time and other delays in response to the off signal. The trigger unit 30, however, remains on until the corrected portion of the metal strip 11 reaches the gauge 18, as shown at point F, after the period of the transportation lag. At this point the input to the trigger unit 30 falls off again, and the actual input to the trigger unit 23 also begins to fall off accordingly, as shown at K in FIGURE 3c.

When the input to the trigger unit 30 falls below the "off" level, as represented by the point G in FIGURE 3a, the output from the integrator 29, which has remained constant from the time that the screw motor 16 ceased to operate, is cancelled, that is to say it is restored to zero, as shown at H, and the input to the trigger units 23 and 30 again becomes equal to the signal from the thickness gauge 18. Until further errors arise, therefore, both trigger units 23 and 30 remain off.

Each correction is therefore performed continuously, that is to say the screw motor runs continuously until the desired correction has been made, and it stops until such time as a new cycle is initiated by the gauge means. There is no unstable "on-off—on-off" operation of the screw motor 16. The correction is applied gradually and in a single period rather than in bursts, of which there may be several in each second.

Turning now to FIGURES 4 and 5 of the drawings, a modification of the system and method according to the present invention includes a refinement to prevent any undesirable screw motor action should the combined gauge signal and integrated screwdown rate signal cause triggering of the trigger 23 and consequent action of the screw 16 in a direction opposite to the correction already applied. This can happen in cases of unusually great errors sensed by the gauge 18, as shown in FIGURE 4. In such a case, the input to the trigger 23 follows the line of FIGURE 4c, which is seen to cross the reverse switch-on value of the screw motor 16 at P, which would cause the screw motor 16 to turn in the wrong direction when it is required to remain out of action.

This action of the screw motor 16 may be prevented by arranging for the operation of the triggers 23 and 30 in the manner set out in FIGURE 5. The triggers 23 and 30 here are of the type that gives a positive output for a negative input exceeding a predetermined level, and a negative output for a positive input exceeding a similar predetermined level.

The outputs of triggers 23 and 30 are fed to relays 33, 34, 35, 36 via diodes 38, 39, 40, 41 respectively. Thus relay 33 responds to a positive output from trigger 23 only, relay 34 responds to a negative output from trigger 23 only, relay 35 responds to a positive output from trigger 30 only, and relay 36 responds to a negative output from trigger 30.

The screw motor relays 26 and 27 are operated in the following manner: the relay 26 is actuated when the relays 33 and 35 are both operated only, while the relay 27 is actuated when the relays 34 and 36 are both operated.

Thus the relay 26 will operate if the outputs of trigger 23 and trigger 30 are both positive, and it will switch off when 23 is reset and will not operate the relay 27 if the output of the trigger 23 goes negative whilst the output of the trigger 30 is positive or zero.

A further modification provides for adjustment permitting control of the strip 11 to various tolerance bands. The arrangement is as shown in FIGURE 1, and attenuators are inserted in both the gauge signal and tacho signal paths. The attenuators reduce the signals when it is required to produce material to a relatively course tolerance. A further attenuator in the tacho path permits manual control of the signal from the integrator 29 to allow for differences in transfer function of the materials being rolled, as previously described.

Another modification is provided to deal with the effect of short transportation lags. Referring to FIGURES 6a, 6b and 6c, the correction is still being applied whilst the corrected strip is appearing in the gauge as shown at N. Hench part, or all, of the signal to the trigger 23 consists of the sum of the correction actually applied to the strip and the integrated correction rate. The trigger 23 will therefore turn off earlier than it should, and the strip 11 will be undercorrected. The trigger 30, in addition, will not reset, and the integrated correction rate will not be cancelled. This difficulty may be overcome in a number of ways, one of which will now be described.

The action is illustrated in FIGURES 7a, 7b, and 7c. The correction is applied in the manner described before and the integrator 29 is allowed to integrate as before, but the process of integration is stopped after the duration of one transportation lag period, by opening the contact S, see FIGURE 5a. The correction on the strip 11 is now appearing in the gauge 18 and the action of switching off the screw motor 16 is brought about by resetting of the trigger 23 from the combined gauge and integrator signal. The correction applied to the strip 11 appears in the gauge 18 for a further transportation lag period and the trigger 30 resets, and the integrator signal is cancelled.

The signal giving the period of the transportation lag is obtained as follows. Referring to FIGURE 8 of the drawings, a rate transducer 43 is coupled to the main drive of the rolling mill or to the passline rolls. The rate transducer 43 may be similar to that coupled to the screw down motor 16, and it rotates at a speed proportional to the velocity of the strip 11 being rolled.

The electrical output of the rate transducer 43 is coupled, via a relay contact 44, to an integrator 45 similar to the integrator 29 coupled to the screw motor rate transducer 28, previously described with reference to FIGURE 5a. The integrator 45 in turn is coupled to a trigger circuit 46.

The action of this arrangement begins when the correction is applied to the strip 11. At this point the relay contact 44 is closed, and the integrator 45 begins to integrate the strip velocity signal from the rate transducer 43. After the period of one transportation lag the integrated strip velocity signal reaches the firing level of the trigger circuit 46 which then operates a relay 47 to open the contact S in the screw motor integrator circuit hereinbefore described with reference to FIGURE 5a. It will be appreciated with this circuit that should the strip velocity decrease, hence giving a longer transportation lag, the signal to the integrator 45 will also decrease and its output will take longer to reach the firing level of the associated trigger 46. It may be shown that the time taken for the trigger 46 to fire is equal to one transportation lag, and that this relationship holds good over a wide range of velocity of the strip 11.

The integrator 45 is reset by a reset signal 48 derived from trigger 30 at the same time as the screw motor integrator 29 is reset.

It will be appreciated that other embodiments may be arrived at. For example, the corrective action on the strip 11 need not be exercised by a screw arrangement acting on the pass rolls as hereinabove described, but the tension exerted on the strip 11 by the take-up roll 17 may be similarly regulated instead.

Also the signal giving the period of the transportation lag may be derived in other ways, for instance by a disc geared to the main drive shaft or the pass line roll, and coupled through suitable means for instance through a slipping clutch, which is restrained from rotating by a solenoid and claw mechanism, such that the solenoid releases the disc when the screw motor 16 starts up and the claw engages again after the period of one revolution. In this way a signal can be derived for one revolution of the disc which by suitable gearing is made equal to one transportation lag period.

It will be appreciated that by means of the system and method according to the present invention, correction to the metal strip 11 is applied gradually and in a single period rather than in bursts, as in proposals of the prior art, while one of the effects of transportation lag, namely instability of the system, is overcome.

I claim:
1. An automatic thickness control system for a material processing mechanism comprising:
   (a) gauge means for monitoring the thickness of the material issuing and spaced apart from, the mechanism and producing a signal representative of the deviation of this thickness from a pre-set value,
   (b) control means connectible to actuator means for actuating the processing mechanism to correct the thickness of the material to the pre-set value, in a single continuous operation,
   (c) a correction responsive device arranged to cooperate with the processing mechanism and producing a signal representative solely of the total quantity of correction applied; the control means having an input connected to the gauge means and the correction responsive device so as to be responsive to the deviation between the output signals thereof and to cease operation of the control means when this deviation becomes reduced to substantially zero, together with
   (d) trigger means connected between the gauge means and the control means and effective after cessation of a correcting operation, to prevent further operation of the control means until the material of corrected thickness has reached the gauge means, thereafter to permit further correction.

2. An automatic control system, according to claim 1, wherein the correction responsive device comprises the combination of a transducer coupled to and responsive to the rate of correction applied to the mechanism by the actuator and an integrator connected to receive and to integrate the output from the transducer.

3. An automatic control system according to claim 2, wherein the transducer comprises a tachometer generator.

4. An automatic control system according to claim 1, wherein the trigger means are connected between the gauge means and the correction responsive device and are arranged to maintain the output signal from this device at the input of the control means until the material of corrected thickness has reached the gauge means and thereafter to remove this output signal from the input of the control means.

5. An automatic control system according to claim 1, wherein the trigger means are connected between the integrator and the gauge means and are arranged to maintain the integrator output at the input of the control means until the material of corrected thickness has reached the gauge means and thereafter to cancel the integrator output thereby to remove it from the input of the control means.

6. An automatic gauge control system according to claim 5, wherein the trigger means are arranged to give a positive output in response to a negative input exceeding a predetermined level and give a negative output in response to a positive input exceeding the predetermined level.

7. A method for controlling the thickness of material issuing from a material processing mechanism comprising the steps of generating in gauge means at a region removed from the mechanism, a gauge signal representative of the deviation of this thickness from a pre-set value, activating the mechanism to correct the thickness to a pre-set value in a single continuous operation and in response to an error signal derived from the gauge signal and a correction signal representative solely of the total quantity of correction applied to the mechanism, so that this correction ceases when the error signal reduces substantially the zero and after such correction preventing further actuation of the mechanism until the material of corrected thickness has reached the gauge means.

8. A method for controlling thickness of material issuing from a material processing mechanism according to claim 7, wherein the signal proportional to the transportation lag of said mechanism is produced by sensing the rate of travel of said material and integrating the signal proportional to this rate of travel and using this integrated signal to prevent undesirable operation of the mechanism.

References Cited by the Examiner
UNITED STATES PATENTS

| | | | |
|---|---|---|---|
| 3,049,036 | 8/1962 | Wallace et al. | 72—9 |
| 3,062,078 | 11/1962 | Hulls | 72—9 |
| 3,128,630 | 4/1964 | Briggs | 72—16 |
| 3,208,251 | 9/1965 | Hulls et al. | 72—16 |

CHARLES W. LANHAM, *Primary Examiner.*

R. D. GREFE, *Assistant Examiner.*